United States Patent [19]

Dausman et al.

[11] Patent Number: 4,872,998
[45] Date of Patent: Oct. 10, 1989

[54] APPARATUS AND PROCESS FOR FORMING UNIFORM, PELLETIZABLE SLUDGE PRODUCT

[75] Inventors: Jerome Dausman, Arlington, Va.; Raymond J. Avendt, Annapolis, Md.

[73] Assignee: Bio Gro Systems, Inc., Annapolis, Md.

[21] Appl. No.: 205,345

[22] Filed: Jun. 10, 1988

[51] Int. Cl.$^4$ .............................................. C02F 11/14
[52] U.S. Cl. .................................... 210/710; 210/737; 210/770; 210/179; 210/180; 210/188; 210/202; 71/12; 34/69
[58] Field of Search ............... 210/737, 770, 774, 710, 210/806, 179, 180, 181, 182, 188, 202; 34/69, 179; 71/12

[56] References Cited

U.S. PATENT DOCUMENTS

| | | | |
|---|---|---|---|
| 548,561 | 10/1895 | Lamb ..................................... | 34/69 |
| 659,503 | 10/1900 | Wood ..................................... | 34/69 |
| 1,915,240 | 6/1933 | Putnam .................................. | 210/667 |
| 2,977,214 | 3/1961 | McLellen .............................. | 71/12 |
| 3,025,151 | 3/1962 | Berg et al. ............................ | 210/614 |
| 3,342,731 | 9/1967 | Baumann et al. .................... | 210/711 |
| 3,676,074 | 5/1970 | Shibayama et al. ................. | 422/209 |
| 3,695,432 | 10/1972 | McCrink .............................. | 210/770 |
| 3,800,865 | 4/1974 | Onarheim et al. .................... | 165/92 |
| 3,909,410 | 9/1975 | Neukamm ............................. | 210/770 |
| 3,963,471 | 6/1976 | Hampton .............................. | 71/12 |
| 4,660,628 | 4/1987 | Solberg et al. ....................... | 165/92 |

FOREIGN PATENT DOCUMENTS

5439372  3/1979  Japan .

OTHER PUBLICATIONS

EPA 625/1-79-011-U.S. Environmental Protection Agency, "Process Design Manual for Sludge Treatment and Disposal", Sep. 1979, Chapter 10, pp. 10-1-1-0-5.

"Chemical Engineer's Handbook", R. Perry and C. Chilton, 5th Ed., 1973, pp. 20-81 to 20-87.

"Rotadisc", Drier Literature, Stord Bartz Americans, Inc.

Primary Examiner—Peter Hruskoci
Assistant Examiner—Christopher Upton
Attorney, Agent, or Firm—Sixbey, Friedman, Leedom and Ferguson

[57] ABSTRACT

An automated, non-polluting process and apparatus for mechanically dewatering and heat drying liquid sewage sludge of widely varying solids content to form a pelletizable, dried sludge of predetermined uniform solids content without requiring recycling of previously heat processed sludge. Prior to being dried, the sludge is mixed with flocculation and coagulation promoting chemicals and is dewatered in a belt-type press. Drying takes place within an indirect heat dryer including an enclosed housing for capturing all gases and particles entrained in the gas driven off during the drying process. The gases and particles are advanced by means of a fan first through a cyclone separator for removing dust particles and next through a water jet scrubber prior to being exhausted or burned in order to control odor. The dust removed by the cyclone separator is recombined with the output from the indirect dryer prior to being pelletized. An automated start-up and shut-down control circuit is disclosed for producing the maximum degree of automation of the overall system and process.

18 Claims, 3 Drawing Sheets

APPARATUS AND PROCESS FOR FORMING UNIFORM, PELLETIZABLE SLUDGE PRODUCT

BACKGROUND OF THE INVENTION

1. Technical Field

The present invention relates to automated, sludge treatment processes and apparatus for converting sludge of widely varying high level, liquid content, such as raw sewage sludge, into a uniform, low moisture, pelletizable sludge product using combined chemical, mechanical and heat treatment steps.

2. Background Art

One of the most significant disposal problems facing modern civilization is how to economically handle the large amounts of sewage sludge produced daily without polluting the environment. This problem is compounded by the fact that sewage sludge is not produced uniformly, either across different sewage treatment plants, or at the same plant across time. Typically, sludge has been disposed of by composting, agricultural land application and/or landfilling. The largest cost component of these disposal options is transportation of the sludge, which is mostly comprised of water.

Attempts to solve the problem of high transportation costs have centered around various techniques for dewatering the raw sewage sludge before transportation. As described in U.S. Pat. No. 3,342,731 to Baumann, conventional dewatering steps involved the use of large area drying beds. As cities have grown and space has become more scarce, smaller-sized apparatus such as screening, heat drying and incineration have been used. To increase the effectiveness of these space saving techniques, flocculants, such as salts of iron and aluminum and organic polyelectrolytes, have been used but have been found disadvantageous because of the large quantity of chemicals often required. As disclosed n U.S. Pat. No. 3,342,731, recirculation of some of the processed sludge, in the form of incinerated residue, will greatly reduce the required quantity of flocculation promoting chemical. Another advantage of recirculation is to promote uniformity in the processed sludge as disclosed by Putnam in U.S. Pat. No. 1,915,240, page 2, lines 75 and 76.

One of the primary purposes for which heat processed sludge can be economically used is as a fertilizer. However, to be marketable as a fertilizer, heat processed sludge is preferably formed into pellets as disclosed in U.S. Pat. No. 3,025,151 to Berg et al. Pellet formation requires uniform sludge preferably having a relatively constant solids content.

One known type of apparatus and process for forming raw sewage sludge into pelletized sludge suitable for fertilizer is disclosed in U.S. Pat. No. 3,963,471 to Hampton. An integrated and automated system is disclosed in this patent including a dewatering phase, a drying phase and an air solids separation phase. In the dewatering phase, chemicals are mixed with liquid sludge supplied from a preliminary storage tank to a dewatering press to form a dewatered sludge cake. Drying takes place in the next phase by means of the addition of fuel to the sludge and ignition of the fuel in the dryer. Hampton states that it is necessary to recirculate hot dried sludge product from the output back to the input of the dryer for mixture with moist dewatered sludge cake entering the dryer to enable drying temperatures to be low enough to prevent formation of clinkers and the ignition of organic material being fed to the dryer. Hampton also states that the percentage of the final product recirculated also determines the size of the pellets produced with smaller pellets being formed as the percentage of recirculated product increases. Hampton discloses a control circuit for automatic delayed start up and shut down, but does not disclose such a system for application to other types of automated sludge processing systems.

Other forms of treating organic waste includes injecting heated gas into the waste while agitating the waste as illustrated in U.S. Pat. No. 3,676,074 to Shibayama et al. This approach, however, creates substantial waste gas having particles entrained therein. One method of eliminating the problem of large quantities of waste gases is to use an indirect heating method and apparatus as disclosed by U.S. Pat. Nos. 3,800,865 to Onarheim et al and 4,660,628 to Solberg, wherein a heat transfer fluid is used to heat plural hollow disks mounted for rotation with a hollow hub. The material to be dried passes through the space between the exterior of the disks and a surrounding housing but the heat transfer fluid is not allowed to come into contact with material being dried. This approach minimizes waste gas and, as noted in advertising material produced by Stord Bartz, assignee of U.S. Pat. Nos. 3,800,865 and 4,660,628, the type of disclosed indirect heater may be used to dry sludge without requiring sludge recirculation.

Others have recognized the advantages of indirect heat in reducing the quantity of waste gas as disclosed in a report of the U.S. Environmental Protection Agency dated September 1979, page 10-4, entitled "Process Design Manual for Sludge Treatment and Disposal".

While the prior art suggests a number of alternative approaches, many of which require recirculation of processed sludge in order to achieve uniformity and allow pelletization, no disclosure exists of an automated, non-polluting process or apparatus for mechanically dewatering and heat drying liquid sewage sludge of widely varying solids content to form a pelletizable dried sludge of predetermined uniform solids content without requiring recycling of previously heat processed sludge.

DISCLOSURE OF THE INVENTION

It is an object of the subject invention to overcome the deficiencies of the prior art. In particular, the process includes a heat drying step in which dewatered sludge is agitated and brought into sliding contact with a heated surface until the desired reduced moisture content is reached.

It is yet another object of the subject invention to provide an automated, non-polluting process for mechanically dewatering and heat drying liquid sewage sludge including mixing of the liquid sewage sludge entering the apparatus with a chemical substance which is capable of promoting flocculation and coagulation followed by mechanically pressing the sludge to separate a substantial portion of liquid to form a cake sludge of at least approximately 10 percent solids followed by heat drying of the cake sludge without addition of recycled, previously processed sludge to form a pelletizable sludge having a predetermined uniform moisture content. In particular, the heat drying step takes place within an enclosure thereby allowing all gases and gas entrained particles driven off by the heat drying step to be captured for further processing by separating the gas entrained particles and by combining the separated particles with the pelletizable sludge produced by the heat drying step.

It is yet another object of the subject invention to provide indirect heat drying means for drying the cake sludge resulting from the process described above in order to form a pelletizable sludge having a predetermined uniform moisture content without the addition of recycled, previously heat processed sludge. The indirect heat drying means includes a housing means having an inlet for receiving the dewatered sludge and an outlet for discharging the sludge when the moisture level has been reduced to a point in which the sludge may be pelletized. Moreover, the indirect heat drying means includes a rotatably mounted hollow hub combined with a plurality of hollow disks mounted on the hub in such a manner as to form a flow path through the hub and the hollow disk for a heat transfer fluid for heating the exterior surfaces of the rotating disk. Dewatered sludge entering the housing means is caused to be brought into sliding contact with the exterior heated surfaces of the rotating disks, while the heat transfer medium is maintained separate therefrom by flowing only through the hollow interiors of said hub and disks.

Still another more limited object of the subject invention is the provision of an automated, non-polluting process and apparatus for chemically and mechanically dewatering and heat drying liquid sewage sludge employing an indirect heating means without the addition of recycled, previously heat processed sludge, wherein a fully automated control means is provided having a sequenced start-up and shut-down of differing components in a system. In particular, the dewatering press, indirect heat dryer and source of heat transfer fluid for the indirect heat dryer are actuated initially upon start-up, while the raw sludge feed pumps and the conveyors used throughout the process are actuated only after the initial components are brought to a proper operating condition. Upon shut-down, the liquid sludge feed pump and chemical flocculation feed are stopped prior to shut-down of the various conveyors and processing components throughout the remainder of the system.

The various objects and advantages of the subject invention are achieved by an automated, non-polluting process and apparatus including means for limiting and modulating the flow of liquid sewage sludge into the apparatus in a manner to prevent the capacity of the apparatus from being exceeded. The system includes a liquid storage tank from which liquid sewage sludge is withdrawn by feed pumps as required for passage through an in line, static mixer designed to receive flocculation and coagulation promoting chemicals. The sludge is advanced to a dewatering press in which a substantial portion of the liquid content of the sludge is removed. The resulting sludge cake having a solids content of above at least approximately 10 percent is advanced by conveyor to a temporary storage tank from which the dewatered cake sludge may be advanced to a indirect rotary disk dryer by means of a plug feeder. During advance of the sludge through the indirect dryer, all gases and particles entrained in gases driven off of the sludge are captured and advanced to a cyclone separator from which the gas is further advanced to a water jet scrubber by means of a fan for exhaust to atmosphere or for advance to a odor control system. Within the indirect dryer, the sludge is brought into contact with the moving heated surfaces of the disk by means of paddles mounted on the disk for stirring and agitating as well as advancing the sludge through the indirect dryer. At the outlet of the dryer, the particles removed from the gases driven off the sludge in the indirect dryer are returned to and combined with the output from the indirect dryer for advance to a pelletizer.

Still other and more limited objects and advantages of the subject invention may be appreciated by consideration of the drawings and Description of the Preferred Embodiment described herein below.

DETAILED DESCRIPTION OF THE PREFERRED EMBODIMENT

Figure 1:
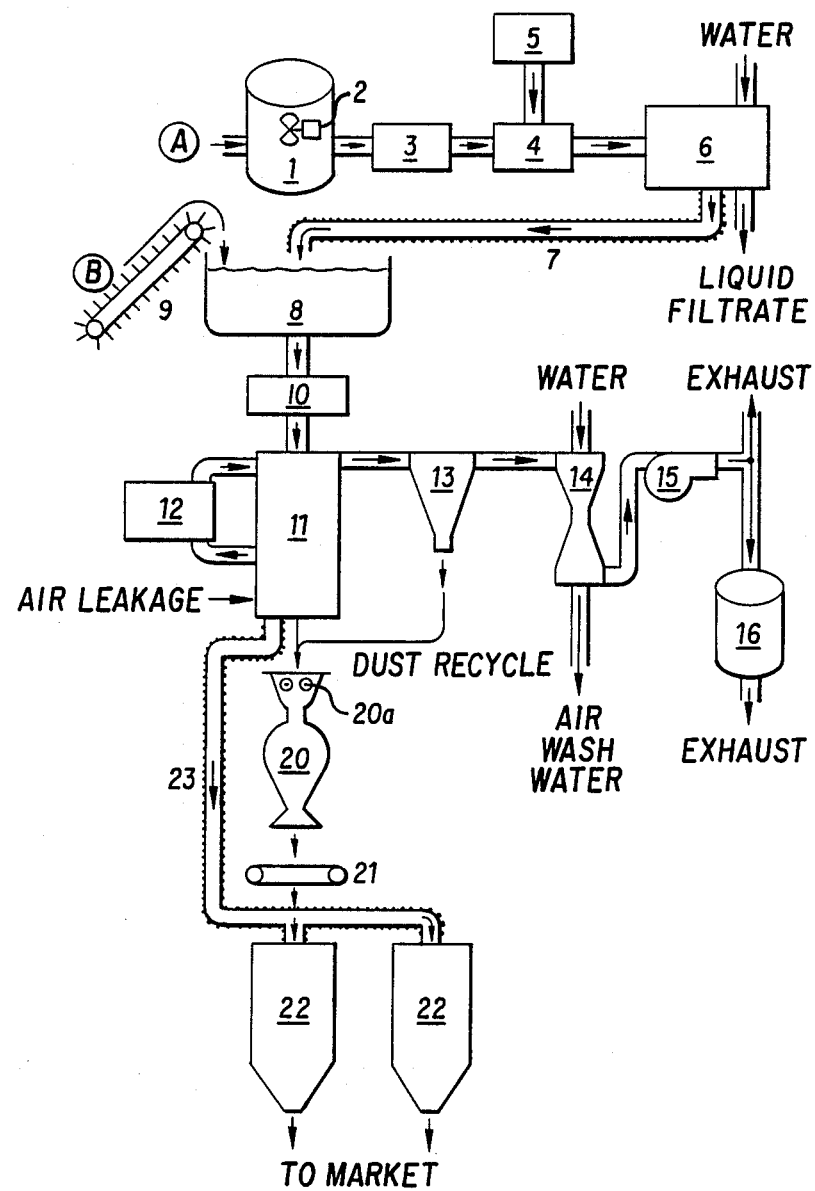
FIG. 1 is a schematic illustration of the process and apparatus by which the subject invention is achieved.

For a clear understanding of the subject invention, reference is made to FIG. 1 in which a highly schematic representation of the subject invention is illustrated to show the various steps and apparatus for carrying out each step employed in the subject invention. As shown in FIG. 1, the flow of liquid sewage sludge enters the apparatus at point A where it is stored in a liquid sludge tank 1 until required for production. The liquid sludge tank is generally equipped with a mixer 2 to prevent the settling of solids in the liquid sludge tank. As the sludge is needed for the process, it is moved by sludge feed pumps 3 to an in line static mixer 4 to a dewatering press 6. The dewatering press may be of the type manufactured by Belt Dewatering Press of Greenwich, New York and sold under the name BDP, Model E Belt Press. The size of the press may be selected dependent upon the desired capacity of the overall system and generally characterized by belt structure arranged for advancing sludge through a series of distinct dewatering steps.

Prior to entering of the dewatering press 6, the liquid sewage sludge is combined with a flocculation and a coagulation promoting chemical from storage tank 5 thereby promoting dewatering of the sludge. After mixing with dewatering chemicals, the solids in the sludge flocculate into small lumps or masses and are squeezed either between metal plates, rollers or by centrifugal action to draw off the excess liquid. The resulting material now commonly known as cake sludge consists of between 10 and 45 percent solids and is then transported by conveyor 7 to a temporary storage tank 8. The liquid squeezed out of the liquid sludge along with any water used to wash the press equipment after the squeeze cycle is returned to a waste water treatment plant. Cake sludge from other dewatering operations may also be added to the process at point B by means of a cake sludge truck unloading conveyor 9.

In the drying portion of the disclosed apparatus and process, cake sludge is fed from the cake sludge storage tank 8 by means of a plug feeder 10 into the indirect contact dryer 11. This component of the system is central to the successful operation of the subject invention and may take the form of a indirect heating dryer manufactured by Stord Bartz AS of Bergin, Norway, sold under the trademark ROTADISC sludge dryer. A typical configuration of such dryer will be described hereinbelow with reference to FIG. 3.

From a functional standpoint, water in the sludge cake is vaporized in the indirect heater 11 by means of either steam or hot oil produced in boiler 12 and circulated through the dryer. The vaporized water is pulled, by vacuum action, into the cyclone 13 to remove air borne dust. From there the air and vapor are pulled through a water-jet scrubber 14 to remove any remaining particles. The water used in the water jet scrubber is returned to a waste water treatment plant (not illustrated). A fan 15 is used to pull the air containing dust and water vapor through the dryer 11, the cyclone 13 and the water jet scrubber 14. In cases where objectional smelling sludge is processed, the exhaust air would then be moved through an odor control system 16 where objectional gases would be burned off or alternatively returned to the boiler 12 where the combustible components could be ignited with the fuel used to heat the boiler.

Dry sludge material is discharged from the indirect contact dryer 11 and goes either directly to the bulk storage 22 by conveyor 23 as fine material, or through a pelletizer 20 to create a more marketable product. Pelletizer 20 includes means, such as rollers 20a, for pressing the fine dry sludge material to create large pieces of pressed sludge having any desired thickness. An example of a pelletizer suitable for use in the subject system is sold by California Pellet Mill Company of Crawfordsville, Indiana as Model No. CPM 7000.

As further shown in FIG. 1, the pelletizer 20 also receives the dust recovered from cyclone 13 to form the pressed pieces described above. This pressed material drops into the pellet cooler and crumbler 21 which also can be adjusted to create pellets of varying sizes. From there the material is transported to finish product storage 22 where it can be mixed with other fertilizer products, sent to bag machines or loaded in rock form for market or disposal.

Figure 2:
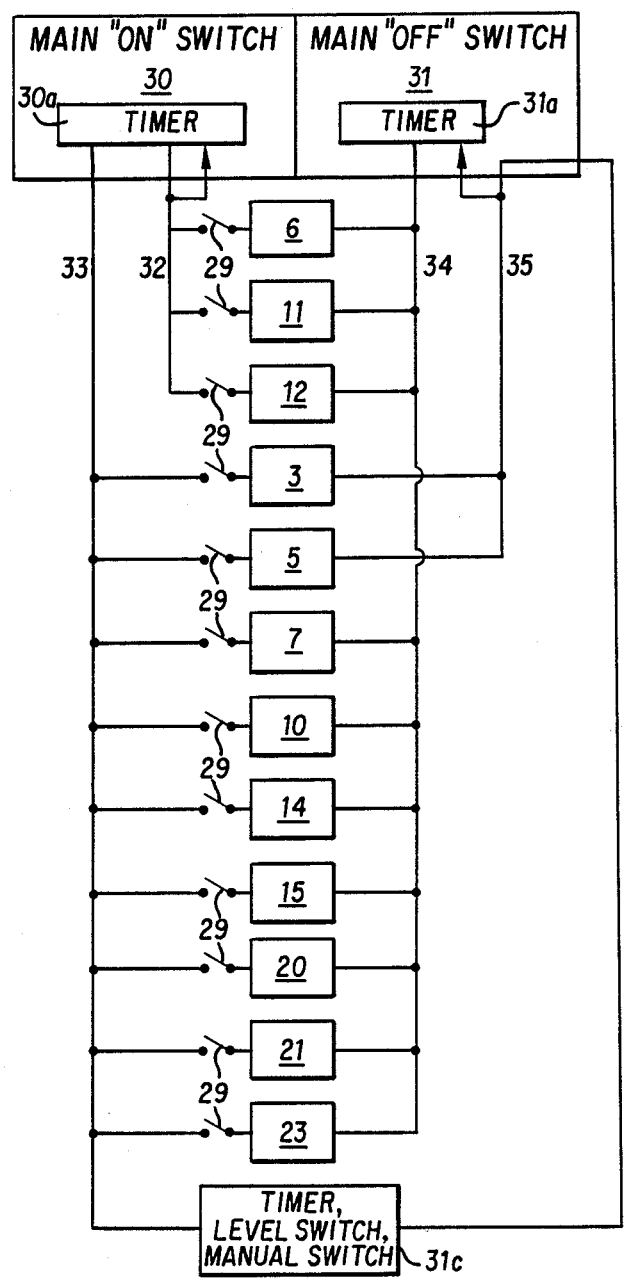
FIG. 2 is a schematic illustration of the electrical circuit for providing automatic start-up and shut-down of the system disclosed in FIG. 1.

FIG. 2 is a diagram of the electrical control circuit which regulates start up and shut down of the various components of the apparatus as illustrated in FIG. 1. The corresponding components are identified by corresponding numbers in FIG. 2. The plurality of manual switches 29 are associated with each of the components, respectively, to allow for individual operator shut down should the need arise. Normally, however, the operator may start up or stop the overall system simply by actuating either the main "on" switch 30 or the main "off" 31, respectively. Once initiated, a corresponding timer 30a or 30b is actuated to effect a desired sequence of control. In particular, the circuit illustrated in FIG. 2 is composed of several subcircuits and time sequenced switches preset for the proper time delay. The main "on" and "off" switches will be centrally located and wired to the various components of the apparatus. In addition or optionally, the main "off" switch may respond to a timer 31c preset to operate the overall system for a specific period of time, such as an eight hour shift. Switch 31c may also sense the existence of a low-level in the incoming liquid sludge storage tank 1 (FIG. 1) to shut down the system. Yet another alternative is to provide a manual switch at a remote location for alternative shut down of the system by operator control. Alternatively, all three of the options regarding switch 31c may be incorporated into the system.

When the main "on" switch 30 is closed, power is supplied to line 32 to start the boiler 12 and indirect contact dryer 11 to preheat the dryer before receiving sludge cake. The sludge dewatering press 6 is also started before receiving any sludge. After a predetermined amount of time, timer 30a activates power supply line 33 which supplies power to the rest of the components of the apparatus.

After a predetermined amount of time or when the apparatus is to be shut down, the main "off" switch 31 is energized. This causes the components of the apparatus to be turned off in a predetermined time sequence that clears sludge and sludge products out of the system before complete shutdown. This keeps sludge from drying in the apparatus and causing damage or corrosion. In particular, line 34 is opened immediately upon actuation of the main "off" switch 31. Accordingly, the sludge feed pump 3 and chemical feed 5 is deenergized. After a predetermined amount of time, as determined by timer 31a, the power supply line 34 is opened to turn off the power to the remaining components in the system and thereby shut down the operation thereof.

Figure 3:
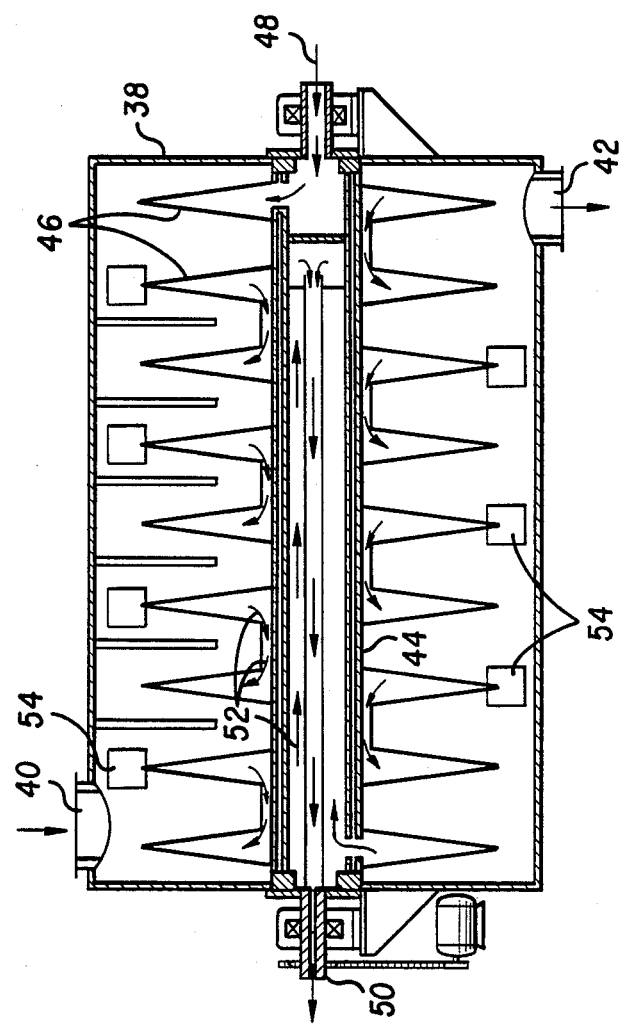
FIG. 3 is a cross-sectional view of the indirect heat drying apparatus employed in the system disclosed in FIG. 1.

Reference is now made to FIG. 3 which discloses a indirect heat drying means of the type employed in the subject system including a housing 38 including an inlet 40 for receiving cake sludge from plug feeder 10 of FIG. 1 and an outlet 42 for discharging the sludge when the moisture level has been reduced to a point in which the sludge can be pelletized. Mounted within housing 38 for rotation therein is a hollow hub 44 upon which is mounted a plurality of hollow disks 46. The interior of each disk communicates with the interior of the hollow hub 44 to provide a flow channel for heat exchange fluid entering the hub at 48 and exiting at 50. One example of the desired flow pattern is illustrated by arrows 52. Attached to the hollow disks are advancing and stirring means such as paddles 54, for bringing the cake sludge into sliding contact with the exterior heated surfaces of the hollow disks and for agitating the cake sludge while in sliding contact with the heated surfaces.

INDUSTRIAL APPLICABILITY

The system, including the process and apparatus disclosed herein, is ideally suited for processing the liquid sewage sludge formed during operation of a typical sewage treatment plant. However, other types of waste sludges may be processed in the disclosed apparatus and by the disclosed process in order to produce a pelletizable sludge. The resulting pelletizable product is ideally suited for use as a soil fertilizer but may be employed in other processes, both agricultural and manufacturing in nature.

We claim:

1. An automated, non-polluting process for mechanically dewatering and heat drying liquid sewage sludge of widely varying solids content within an apparatus having a predetermined capacity to form a pelletizable, dried sludge of predetermined uniform solids content without requiring recycling of previously heat processed sludge, comprising the steps of
   a. limiting and modulating the flow of liquid sewage sludge into the apparatus in a manner to prevent the capacity of the apparatus from being exceeded;
   b. mixing with the liquid sewage sludge entering the apparatus a chemical substance which is capable of promoting flocculation and coagulation;
   c. dewatering the chemically treated sludge by mechanically pressing the sludge to separate a substantial portion of liquid to form a cake sludge of at least approximately 10 percent solids; and d. heat drying the cake sludge within an enclosed drying means without addition of recycled, previously heat processed sludge to form a pelletizable sludge having a predetermined uniform moisture content, said heat drying step including steps of
  (i) bring the cake sludge into sliding contact with a heated surface,
  (ii) agitating the cake sludge while in sliding contact the heated surface,
  (iii) capturing in the enclosure and drawing away from said drying means substantially all gases and gas entrained particles expended from said sludge by said heat drying step for further processing,
  (iv) continuing steps (i) and (ii) until the moisture content of the heat processed sludge is reduced to the desired predetermined level, and
  (v) delivering said heat processed sludge to an accumulation means for storing said processed sludge.

2. A process as defined in claim 1, further including the step of separating the gas entrained particles from the gas driven off in the heat drying step and combining the separated particles with the pelletizable sludge produced by the heat drying step.

3. The process as defined in claim 2, wherein the step of separating gas entrained particles includes centrifugal separation of the particles followed by water scrubbing of any particles remaining in the captured gas.

4. The process as defined in claim 3, further including the step of burning any combustible components in the captured gas from which particles have been separated.

5. The process as defined in claim 1, further including the step of temporarily storing the cake sludge produced by the dewatering step (c) to allow the heat drying step to proceed temporarily independent of the rate of output of the dewatering step (c).

6. The process as defined in claim 1, further including the step of forming the heat dried sludge produced by step (d) into pellets of desired size and moisture content prior to delivering said heat processed sludge to said accumulation means.

7. The process as defined in claim 6, wherein the step of pelletizing includes pressing the heat dried sludge into large pieces of desired thickness and mechanically breaking the pieces into pellets of desired size.

8. The process as defined in claim 1, wherein the step of heat drying includes the step of heating the heated surface by means of a heat transfer fluid which remains separated from the sludge being processed.

9. An automated, non-polluting apparatus of predetermined capacity for mechanically dewatering and heat drying liquid sewage sludge of widely varying solids content to form a pelletizable, dried sludge of predetermined uniform solids content without requiring recycling of previously heat processed sludge, comprising:
  (a) control means for limiting and modulating the flow of liquid sewage sludge into the apparatus in a manner to prevent the capacity of the apparatus from being exceeded;
  (b) mixing means for mixing with the liquid sewage sludge entering the apparatus a chemical substance which is capable of promoting flocculation and coagulation;
  (c) dewatering means for dewatering the chemically treated sludge by mechanically pressing the sludge to separate a substantial portion of liquid to form a cake sludge of at least approximately 10 percent solid;
  (d) heat drying means for drying the cake sludge without addition of recycled, previously heat processed sludge to form a pelletizable sludge having a predetermined uniform moisture content, said heat drying means including
    (i) heated surfaces,
    (ii) advancing and stirring means for bring the cake sludge into sliding contact with said heated surfaces and for agitating the cake sludge while in sliding contact with the heated surface,
    (iii) housing means surrounding said heated surface and said advancing and stirring means for surrounding and containing the sludge being heated and means for capturing and drawing away substantially all gases and gas entrained particles expended from the heated sludge, said housing means including inlet means for receiving the dewatered sludge and outlet means for discharging the sludge when the moisture level has been reduced to a point at which the sludge can be pelletized; and
  (e) an accumulation means for receiving said processed sludge from said outlet of said housing means.

10. The apparatus as defined in claim 9, further including separating means for separating the gas entrained particles from the gas drawn away from the heat drying means.

11. The apparatus as defined in claim 10, wherein said separating means includes a centrifical separator and a water scrubber means for removing any particles remaining in the gas discharged by said centrifical separator.

12. The apparatus as defined in claim 11, further including odor control means for burning any combustible components in the captured gas from which particles have been separated.

13. The apparatus as defined in claim 10, further including means for returning the separated gas entrained particles to the processed sludge discharged from said outlet means.

14. The apparatus as defined in claim 9, further including a cake sludge storing means for temporarily storing the cake sludge produced by said dewatering means to allow the heat drying means to operate temporarily independent of the rate of output of the dewatering means.

15. The apparatus as defined in claim 9, further including pelletizing means positioned between said outlet and said accumulation means for forming the heat dried sludge produced by said heat drying means into pellets of desired size and moisture content prior to delivering said processed sludge to said accumulation means.

16. The apparatus as defined in claim 15, wherein said pelletizing means includes pressing means for pressing the heat dried sludge into large pieces of desired thickness and breaking means for mechanically breaking the pieces into pellets of desired size.

17. The apparatus as defined in claim 9, wherein said heat drying means includes heat transfer means for heating said heated surface by a heat transfer fluid which remains separated from the sludge being processed.

18. The apparatus as defined in claim 9, wherein said heated surfaces includes a hollow rotatable cylindrical hub and a plurality of hollow disks mounted in axially spaced relation for rotation with said hub, wherein the space within said housing which is exterior to said disks forms a passage through which said sludge passes while being heated and wherein said advancing and stirring means includes paddles mounted on said disks.

* * * * *